United States Patent Office 2,908,686
Patented Oct. 13, 1959

2,908,686

OCTAHYDRO-INDOLO-QUINOLIZINE DERIVATIVES

Aaron Cohen and Peter George Philpott, Welwyn Garden City, England, assignors to Hoffmann-La Roche Inc., Nutley, N.J., a corporation of New Jersey No Drawing. Application September 3, 1958
Serial No. 758,693

Claims priority, application Great Britain
September 27, 1957

12 Claims. (Cl. 260—294.3)

This invention relates to novel octahydro-indolo-quinolizine derivatives and salts thereof. More particularly, the invention relates to substituted 1,2,3,4,6,7,12,12b-octahydro-indolo[2,3-a] quinolizines. Still more particularly, the invention relates to bases represented by the structural formula (I)

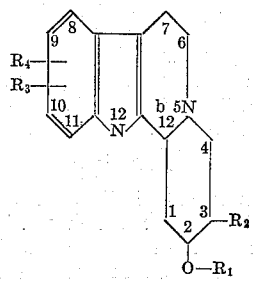

wherein $R_1$ represents hydrogen, lower alkanoyl and phenyl lower alkanoyl, $R_2$ represents hydrogen and lower alkyl and $R_3$ and $R_4$ each represents hydrogen, halogen, lower alkyl and lower alkoxy, and to acid addition salts of such bases.

The lower alkanoyl groups represented by $R_1$ in the above formula include the radicals of lower fatty acids, for example, acetyl, propionyl, butyryl, isobutyryl, and the like. $R_1$ also represents similar lower alkanoyl groups with a phenyl radical attached to the terminal carbon atom so as to obtain such aralkanoyl groups as benzoyl, phenacetyl, and the like. Lower alkyl groups represented by $R_2$, $R_3$ or $R_4$ include such radicals as methyl, ethyl, propyl, isopropyl, butyl, isobutyl, amyl, and the like. Lower alkoxy groups represented by $R_3$ or $R_4$ include such groups as methoxy, ethoxy, propoxy, isopropoxy, butoxy, and the like. The halogens represented by $R_3$ or $R_4$ include chlorine, bromine, iodine, etc.

In the class of compounds represented by Formula I, a preferred group constitutes those compounds wherein $R_1$ represents hydrogen. Another preferred group of compounds within the above class are those wherein $R_3$ and $R_4$ in Formula I are in the 9 and/or 10 position. Still another preferred group constitutes those compounds of Formula I wherein $R_1$ represents lower alkanoyl and $R_2$, $R_3$ and $R_4$ each represents hydrogen.

The compounds having the Formula I above are produced by reducing a ketone having the structural formula (II)

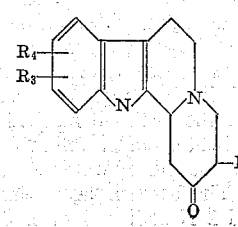

wherein $R_2$, $R_3$ and $R_4$ have the same significance as in Formula I, to produce a compound having the formula (III)

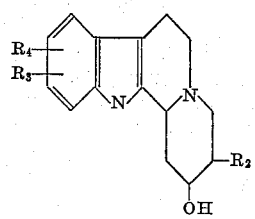

wherein $R_2$, $R_3$ and $R_4$ have the same significance as in Formula I. Compounds of the Formula I wherein $R_1$ represents lower alkanoyl or phenyl lower alkanoyl are obtained by acylating the corresponding compound of Formula III.

The reduction of Compound II to Compound III may be effected by hydrogenation in the presence of a hydrogenation catalyst, e.g. platinum, palladium, etc. or by treatment with lithium aluminum hydride in an anhydrous solvent such as ether, tetrahydrofuran, dioxane, etc. or with sodium- or potassium borohydride in methanol.

The compounds having the Formula III may be acylated by treatment with the appropriate acid anhydride, e.g. acetic anhydride, propionic anhydride, butyric anhydride, etc. in the presence of a tertiary base such as pyridine, or by using a lower alkyl ester of the acylating acid in the presence of an alkaline catalyst, for example, sodium metal or alkali metal alkoxide, e.g. sodium methoxide.

The compounds of this invention contain two asymmetric centers (position 2 and position 12b) when $R_2$ represents hydrogen and three asymmetric centers (position 2, position 3 and position 12b) when $R_2$ represents lower alkyl. Two different racemates may therefore be obtained when an oxo compound which does not contain a 3-substitutent is reduced and 4 racemates may be obtained when an oxo compound which does contain a 3-substituent is reduced. According to the method of reduction, the composition of the product varies and, in general, consists primarily of one or the other of the aforementioned racemates. It will accordingly be appreciated that the general formulae given herein are intended to include the racemates and optical isomers.

The compounds of Formula I form acid addition salts by reaction of the base with about an equivalent proportion or a slight excess of an inorganic or organic acid. Such salts include, for example, the hydrohalides, e.g. hydrochloride, hydrobromide, hydroiodide, other mineral acid salts such as nitrate, sulfate, phosphate, and the like; and organic salts such as acetate, tartrate, citrate, benzoate, salicylate, ascorbate, benzenesulfonate, toluenesulfonate, etc. The acid addition salts described above may be converted to the free base by treatment with an alkali, e.g. sodium hydroxide, under mild conditions. When the desired product is obtained initially in the form of an acid salt, it may be converted to the free base in the same manner described above. When the product of acylation is in the form of a salt and it is treated with alkali in order to obtain the free base, it is necessary to use mild conditions so that no hydrolysis of the acyloxy group takes place.

The ketone of Formula II, when $R_2$, $R_3$ and $R_4$ each represents hydrogen may be obtained by condensing an ester, e.g. a lower alkyl ester such as the methyl or ethyl ester, of 1-carboxymethyl-2,3,4,9-tetrahydro-1H-pyrid[2,3-b]indole with an acrylic acid ester, e.g. a lower alkyl ester such as the methyl or ethyl ester, cyclizing the resulting di-ester of 1-carboxymethyl-2-(2'-alkyl-2'-carboxyethyl)-2,3,4,9-tetrahydro-1H-pyrid[2,3-b]indole by means of a Dieckmann reaction to obtain a lower alkyl ester of 1 - carboxy-2-oxo-1,2,3,4,6,7,12,12b-octahydro-indolo [2,3-a]-quinolizine, then hydrolizing and decarboxylating the said ester. The condensation of the indole ester and acrylic acid ester may be effected in the absence of a catalyst or, if desired, in the presence of a weak Lewis acid catalyst. The Dieckmann cyclization may conveniently be carried out using the crude product of the condensation step and heating it in an inert solvent such as dry benzene with an alkali metal alkoxide, such as sodium methoxide. The hydrolysis and decarboxylation can be conveniently carried out by heating the cyclized product under reflux with hydrochloric acid until the evolution of carbon dioxide ceases.

When a product having the Formula I wherein $R_2$ represents a lower alkyl group is desired, an α-alkyl-acrylic acid ester is used as starting material in the initial condensation. When a product having the Formula I wherein $R_3$ and/or $R_4$ represent other than hydrogen is desired, an appropriately substituted 1-carboxymethyl-2,3, 4,9-tetrahydro-1H-pyrid[2,3-b]indole ester is used in the condensation with the acrylic acid ester.

To minimize the formation of by-products it is advantageous to carry out all the process steps in an inert atmosphere, e.g. under nitrogen.

The compounds of this invention are useful as sedatives and as hypotensive agents. They may be administered orally or parenterally be incorporating the free base or a medicinally acceptable acid addition salt thereof, in therapeutic dosage, in a conventional dosage form such as tablet, capsule, elixir, injectable or the like, together with solid or liquid excipients as desired, according to accepted practice.

The following examples are illustrative of the invention but not limitative thereof. All temperatures are stated in degrees centigrade.

*Example 1*

1.78 g. of 2-oxo-1,2,3,4,6,7,12,12b-octahydro-indolo[2, 3-a]-quinolizine in a mixture of 100 ml. of dry diethyl ether and 25 ml. of dry dioxane were added to a suspension of 0.3 g. of lithium aluminum hydride in a mixture of 100 ml. of dry diethyl ether and 25 ml. of dry dioxane. The resulting mixture was stirred under reflux for one hour and then allowed to stand for 16 hours. The mixture was then treated with a small quantity of water to decompose the metal complex and precipitate the lithium and aluminum in the form of their hydroxides. The lithium- and aluminum-hydroxides were filtered off and washed with dioxane. The filtrate and washings were then evaporated and the residue was crystallized from benzene, giving yellow-brown needles of 2-hydroxy-1,2,3,4,6,7,12, 12b-octahydro-indolo[2,3-a]-quinolizine, M.P. 251–253° (with dec.). On treatment of a methanolic solution of the compound with charcoal, filtering and allowing to cool, a crop of colorless needles which melted at 253–255° (with dec.) were first obtained, and this was followed by a further crop which melted at 262–265° (with dec.).

*Example 2*

2.0 g. of 2-oxo-1,2,3,4,6,7,12,12b-octahydro-indolo[2, 3-a]-quinolizine in 25 ml. of dry tetrahydrofuran were added to a suspension of 0.4 g. of lithium aluminum hydride in 10 ml. of dry tetrahydrofuran. The resulting mixture was stirred under reflux for 2 hours and then chilled and treated with 1 ml. of ethyl acetate followed by 0.5 ml. of water and 2.0 ml. of 2 N sodium hydroxide solution. The solution was filtered and the solid was washed with 2 × 10 ml. of tetrahydrofuran. The filtrate and washings were evaporated to give colorless needles of 2 - hydroxy - 1,2,3,4,6,7,12,12b-octahydro-indolo[2,3-a]- quinolizine, M.P. 262–265° (with dec.).

*Example 3*

A solution of 1.0 g. of 2-hydroxy-1,2,3,4,6,7,12,12b- octahydro-indolo[2,3-a]quinolizine in 15 ml. of dry pyridine was treated at 0° with 7.5 ml. of acetic anhydride and then allowed to stand for 16 hours in the dark at about 20°. The solution was evaporated under reduced pressure and the residual gum was treated with 25 ml. of 2 N ammonia. The solid was collected, washed with water and dried. It was purified by chromatography on neutral alumina in benzene to give colorless needles of 2-acetoxy-1,2,3,4,6,7,12,12b-octahydro-indolo [2,3-a]quinolizine which melted at 188–189° after crystallization from benzene/light petroleum (boiling range 60–80°).

*Example 4*

A solution of 1.0 g. of 2-hydroxy-1,2,3,4,6,7,12,12b- octahydro-indolo[2,3-a]quinolizine in 100 ml. of dry dioxane was heated under total reflux through a short Fenske column. A small chip of sodium was added, followed by 1.06 ml. of ethyl butyrate. The solvent was very slowly distilled through the column (50 ml. in 2 hours) and finally evaporated to dryness under reduced pressure. The residue was partitioned between water and ether, filtered from a little unchanged 2-hydroxy-1,2,3,4,6,7,12,12b-octahydro-indolo[2,3-a]quinolizine and the ether solution dried. Chromatography on neutral alumina with ethyl acetate/benzene (1/1) gave an oil which was converted to the hydrochloride by treatment with ethanolic hydrogen chloride. Crystallization from ethanol/ethyl acetate gave colorless microcrystals of the hydrochloride of 2-butyroxy-1,2,3,4,6,7,12,12b-octahydro-indolo [2,3-a]quinolizine, M.P. 279–282° (with dec.).

*Example 5*

2.0 g. of 2-hydroxy-1,2,3,4,6,7,12,12b-octahydro-indolo[2,3-a]quinolizine were transesterified with 2.5 g. of ethyl benzoate by the procedure described in Example 4. The crude product, after evaporation of the dioxane, was partitioned between ether and water. The ether extracts were dried and evaporated. The residual solid was converted to the hydrochloride with ethanolic hydrogen chloride and crystallized from aqueous methanol to give the hydrochloride of 2-benzoyloxy-1,2,3,4, 6,7,12,12b - octahydro - indolo[2,3-a]quinolizine, M.P. 294.5–295° (with dec. and effervescence).

The hydrochloride obtained above was treated with dry ammonia to give the free base, 2-benzoyloxy-1,2,3,4, 6,7,12,12b - octahydro - indolo[2,3-a]quinolizine, which crystallized from ethyl acetate/light petroleum (boiling range 60–80°) in light orange leaflets, M.P. 163–165° (with dec.).

*Example 6*

A solution of the ethyl ester of 1-carboxymethyl-2,3, 4,9-tetrahydro-1H-pyrid[3,4-b]indole (from 7.5 g. of the hydrochloride) in 37.5 ml. of methyl methacrylate containing 2.5 ml. glacial acetic acid was heated under reflux for 15 hours. The resulting solution was evaporated under reduced pressure and the residue was re-evaporated with toluene. The residual oil was dissolved in ether and washed with 2 N ammonia. The ether solution was then extracted with 2 N hydrochloric acid and the acid extracts were made basic with ammonia and extracted with ether. The residue from the dried extracts consisted of a crude product which was not purified but was utilized directly in the next stage.

A suspension of sodium ethoxide (from 0.69 g. of sodium, 2.2 equivalents) in 100 ml. of dry benzene was treated, under dry nitrogen, with 50 ml. of a dry benzene solution containing the crude product obtained above. The suspension was heated under reflux for one hour and then slowly distilled through a Vigreux column until the temperature of the distillate reached 80°. The suspension was then heated under reflux for an additional hour and chilled. 100 ml. of water were added and the layers separated. The benzene layer was extracted with 3 × 50 ml. of cold 2 N sodium hydroxide solution until the benzene layer no longer gave a positive ferric chloride test. The combined aqueous solutions were washed with benzene and then saturated with carbon dioxide. The precipitated β-keto-ester was extracted with ether and the extracts were dried and evaporated. Recrystallization from benzene/light petroleum (boiling range 60–80°) gave colorless rhombohedra of 1-ethoxycarbonyl-3-methyl-2-oxo - 1,2,3,4,6,7,12,12b-octahydro-indolo[2,3-a]quinolizine, M.P. 183–185°.

0.8 g. of 1-ethoxycarbonyl-3-methyl-2-oxo-1,2,3,4,6,7,12,12b-octahydro-indolo[2,3-a]quinolizine were heated in a stream of nitrogen under reflux with 25 ml. of 2 N hydrochloric acid for 5 hours, by which time no further evolution of carbon dioxide was detectable. The suspension was cooled, made basic with ammonia (sp. gr. 0.880) and extracted with ether. The residue from the dried extracts was crystallized from ethyl acetate/light petroleum (boiling range 60–80°). The 2-oxo-3-methyl-1,2,3,4,6,7,12,12b - octahydro - indolo[2,3-a]quinolizine crystallized in the form of light yellow hexagonal plates, M.P. 209–211°.

A solution of 0.76 g. of 2-oxo-3-methyl-1,2,3,4,6,7,12,12b-octahydro-indolo[2,3-a]quinolizine in 50 ml. of methanol was stirred at about 20° and treated with 0.13 g. of potassium borohydride in portions. Stirring was continued for 2 hours and the solution was then evaporated under reduced pressure. The residue was treated with 10 ml. of 2 N sodium hydroxide solution and 20 ml. of water. The product was chilled to 0°, collected, washed with water and dried. Crystallization from ethyl acetate gave colorless microcrystals of 2-hydroxy-3-methyl-1,2,3,4,6,7,12,12b-octahydro-indolo[2,3-a] quinolizine, M.P. 270–272° (with dec.).

*Example 7*

A solution of 2.64 g. of 5,6-dimethoxy-tryptamine-2-carboxylic acid (prepared from 3,4-dimethoxy-aniline by the method of Abramovitch and Shapiro, J.C.S. 1956, 4599) in 26.4 ml. of water and 5 ml. of 2 N hydrochloric acid was heated under reflux for 20 hours in a stream of nitrogen until decarboxylation was complete. This solution was cooled to 45°, treated with 1.6 g. of ethoxycarbonyl-pyruvic acid (Groves and Swan, J.C.S. 1952, 650), and allowed to stand overnight at this temperature in a nitrogen atmosphere. The resulting suspension was chilled and the solid collected and dried (1.86 g., M.P. 242–244°). The filtrate was basified with ammonia and extracted with ether. The residue from these dried extracts, together with the solid product (M.P. 242–244°) above was dissolved in 30 ml. of absolute ethanol and the solution saturated with dry hydrogen chloride at 0°. This was then heated under reflux for 5 hours, chilled, and the solid collected, washed with ethyl acetate and dried in vacuo over sodium hydroxide. Recrystallization from aqueous ethanol gave colorless needles of 1-ethoxycarbonylmethyl-2,3,4,9-tetrahydro-6,7-dimethoxy-1H-pyrid[3,4-b]indole hydrochloride; M.P. 226–227° (with dec.).

A solution of 13.0 g. of 1-ethoxycarbonylmethyl-2,3,4,9-tetrahydro-6,7-dimethoxy - 1H - pyrid[3,4-b]indole, obtained from the corresponding hydrochloride, in 50 ml. of hot ethyl acrylate was transferred to a Carius tube and heated at 150° for 15 hours. Evaporation of the resulting solution, followed by re-evaporation with toluene gave a gum which failed to crystallize. The crude material was employed in the following stages.

The impure diester from the preceding stage (9.1 g.) was dissolved in 100 ml. of dry benzene and added to a suspension of alcohol-free sodium ethoxide (from 0.75 g. of sodium) in 100 ml. of dry benzene under dry nitrogen. The suspension was heated under reflux for one hour and then the solvent was slowly distilled through a Vigreux column until the boiling point of the distillate reached 80°. The benzene was then evaporated under reduced pressure and the resulting solid treated with dry ether and collected. This was suspended in 50 ml. of benzene and 100 ml. of 3.6% hydrochloric acid and the mixture heated under reflux in a stream of nitrogen for 6 hours. The solution was chilled, basified with ammonia (sp. gr.=0.880) and extracted with ethyl acetate. The extracts were dried and evaporated to small bulk when the products crystallized. It was collected and washed with ethyl acetate. Recrystallization from ethyl acetate/light petroleum (B.P. 60–80°) (charcoal) gave colorless polyhedra of 2-oxo-9,10-dimethoxy - 1,2,3,4,6,7,12,12b - octahydro - indolo[2,3-a]quinolizine; M.P. 216.5–217.5° (1.9 g). A further small quantity was isolated from the mother liquor after purification by chromatography on basic alumina (Brockmann, Grade II).

A solution of 1.5 g. of 2-oxo-9,10-dimethoxy-1,2,3,4,6,7,12,12b-octahydro-indolo[2,3-a]quinolizine in 150 ml. of dry tetrahydrofuran was added dropwise to a suspension of 0.5 g. of lithium aluminum hydride in 50 ml. of dry tetrahydrofuran with stirring. The solution was stirred for an additional hour at about 20° and then heated under reflux for one hour. The solution was chilled, 1 ml. of ethyl acetate was added, followed cautiously by 1 ml. of water and 5 ml. of 2 N sodium hydroxide solution. The suspension was filtered, the solid was washed with 2 x 20 ml. of tetrahydrofuran and the filtrate and washings were evaporated under reduced pressure. The residue was crystallized from ethanol to give colorless microcrystals of 2 - hydroxy - 9,10 - dimethoxy - 1,2,3,4,6,7,12,12b-octahydro-indolo[2,3-a]quinolizine, M.P. 245–248° (with dec.).

*Example 8*

A solution of 17.4 g. of 5-chloro-tryptamine [prepared from p-chloro-aniline by the method of Abramovitch and Shapiro (loc. cit.)] in 240 ml. of water was treated at 45° with a solution of 37.8 g. of ethoxycarbonyl-pyruvic acid in 90 ml. of water and the solution allowed to stand at 45° for 66 hours. The resulting suspension was filtered hot and the filtrate treated with a further 12.6 g. of ethoxycarbonyl-pyruvic acid and the reaction continued at 45° for a further 24 hours. The solution was chilled and filtered. The total solids collected were dried in vacuo at 40° and esterified with ethanolic hydrogen chloride to give 9.47 g. of 1-ethoxycarbonylmethyl-6-chloro-2,3,4,9-tetrahydro-1H-pyrid[3,4-b]indole hydrochloride, M.P. 272–274° (with dec. and effervescence).

The above 9.47 g. of ester hydrochloride was converted to the free base and heated in a Carius tube with 50 ml. of ethyl acrylate at 150° for 15 hours. Evaporation of the solution followed by re-evaporation with dry toluene gave a gum. The full base was used in its impure state for the following stages.

The base was dissolved in 100 ml. of dry benzene and added to a suspension of alcohol-free sodium ethoxide (from 1.29 g. of sodium) in 100 ml. of dry benzene and heated under reflux in a stream of dry nitrogen for 1 hour. The solvent was then slowly distilled through a Vigreux column until the boiling point of the distillate reached 80°. The benzene was evaporated under reduced pressure and the residue treated with dry ether. The solid sodio-derivative was collected, washed with ether and dissolved in water. The crude β-keto-ester was precipitated with carbon dioxide and extracted with benzene. The extracts were evaporated to small bulk (50 ml.) and then treated with 200 ml. of 3.6% hydrochloric acid and heated under reflux in a stream of nitrogen for 7 hours.

The solution was basified with ammonia (sp. gr.=0.880) and extracted with ethyl acetate. The residue from the dried extracts was purified by chromatography on basic alumina (Brockmann, grade II) and eluted with ethyl acetate to give light yellow colored crystals M.P. 189–192° (1.0 g.). Recrystallization from ethyl acetate/light petroleum (B.P. 60–80°) gave colorless rhombohedra of 2 - oxo - 9 - chloro - 1,2,3,4,6,7,12,12b-octahydro-indolo[2,3-a]quinolizine, M.P. 191–194°.

0.5 g. of 2-oxo-9-chloro-1,2,3,4,6,7,12,12b-octahydroindolo[2,3-a]quinolizine were reduced with 0.1 g. of potassium borohydride according to the procedure described in Example 6. The product, 2-hydroxy-9-chloro-1,2,3,4,6,7,12,12b - octahydro - indolo[2,3 - a]quinolizine, was crystallized from ethanol containing 5% methanol, M.P. 285–286° (with dec.).

We claim:

1. A compound selected from the group consisting of bases having the formula

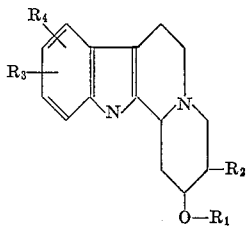

wherein $R_1$ represents a member of the group consisting of hydrogen, lower alkanoyl and phenyl lower alkanoyl, $R_2$ represents a member of the group consisting of hydrogen and lower alkyl, and $R_3$ and $R_4$ each represents a member of the group consisting of hydrogen, halogen, lower alkyl and lower alkoxy, and medicinally acceptable acid addition salts of said bases.

2. 2-lower alkanoyloxy-1,2,3,4,6,7,12,12b-octahydro-indolo[2,3-a]quinolizine.

3. 2-acetoxy-1,2,3,4,6,7,12,12b-octahydro-indolo[2,3-a]quinolizine.

4. 2-phenyl lower alkoxy-1,2,3,4,6,7,12,12b-octahydro-indolo[2,3-a]quinolizine.

5. 2 - benzoyloxy - 1,2,3,4,6,7,12,12b - octahydro-indolo[2,3-a]quinolizine.

6. 2-hydroxy-3-lower alkyl-1,2,3,4,6,7,12,12b - octahydro-indolo[2,3-a]quinolizine.

7. 2-hydroxy-3-methyl-1,2,3,4,6,7,12,12b-octahydro-indolo[2,3-a]quinolizine.

8. 2 - hydroxy - 9,10-di-lower alkoxy-1,2,3,4,6,7,12,12b-octahydro-indolo[2,3-a]quinolizine.

9. 2 - hydroxy - 9,10-dimethoxy-1,2,3,4,6,7,12,12b-octahydro-indolo[2,3-a]quinolizine.

10. 2 - hydroxy - 9-halo-1,2,3,4,6,7,12,12b-octahydro-indolo[2,3-a]quinolizine.

11. 2-hydroxy-9-chloro-1,2,3,4,6,7,12,12b-octahydro-indolo[2,3-a]quinolizine.

12. 2 - hydroxy - 1,2,3,4,6,7,12,12b - octahydro - indolo[2,3-a]quinolizine.

References Cited in the file of this patent

UNITED STATES PATENTS 2,642,438    Duschinsky _____ June 16, 1953

OTHER REFERENCES

Julian et al.: J.A.C.S., vol. 70, p. 180 (1948).
Manske et al.: Jour. Chem. Soc., p. 240 (1927).